Patented Aug. 6, 1940

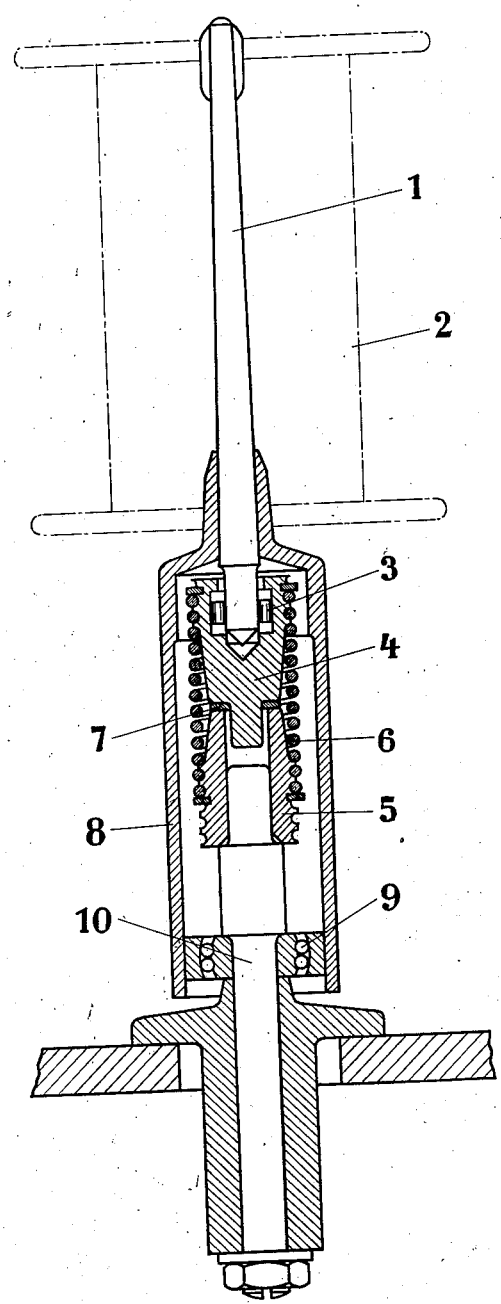

2,210,358

UNITED STATES PATENT OFFICE 2,210,358

TWISTING SPINDLE, ESPECIALLY FOR ARTIFICIAL SILK

Otto Bochmann, Remscheid-Lennep, Germany, assignor to Barmer Maschinenfabrik Aktiengesellschaft, Wuppertal-Oberbarmen, Germany Application March 3, 1938, Serial No. 193,655
In Germany December 24, 1936

2 Claims. (Cl. 308—152)

This invention relates to a twisting spindle for slip-on bodies with great mass accumulated around the central axis of the spindle, for example wooden bobbins, flanged bobbins or the like with artificial silk. In spindles loaded in this manner a displacement of the ideal axis takes place through a certain angle corresponding to the centrifugal forces generated. In these spindles the theory of gyration must therefore be taken as a basis, that is the rotating mass must be capable of displacement in such a manner that the centre of gravity returns into the ideal axis. In a spindle loaded in this sense the dynamic centrifugal forces do not extend through the centre of gravity of the rotating mass but at a certain angular displacement of the axis or of the spindle shank, the lines intersect directly below the rotating mass body.

Spindles have become known which, besides having a foot bearing directly below the rotating mass, have also a collar bearing drawn down in bell shape, the bell serving as driving wharve. However, in these known spindles the stationary bearing part is rigid for accommodating the spindle shank so that no gyration can occur here. This, however, results in unsteady running of the spindle, very heavy stressing of the bearing and consequently short life of the bearing and continually increasing consumption of power.

Spindles are also known, in which the stationary bearing part is rendered elastic by a spring or a similar device, this elastic connection being, however, located in the interior of the yarn body. The result of this arrangement is, that the yarn body which has unbalanced moments along its entire length is unable to adjust itself into the ideal axis of rotation when running. All unbalanced moments which are above the elastic connection would be capable of adjusting themselves, but all those located below the elastic connection are incapable of so doing. The result is, that the spindle does not become steady when running but swirls, so that on the one hand the bearings are much more heavily stressed and their life is considerably shortened and on the other hand such a spindle consumes much more power.

The object of the invention is, to avoid these objections on spindles which are to be employed for the above mentioned mass bodies.

The invention consists in that in a twisting spindle with a foot bearing also an oscillatable collar bearing drawn downwards in bell-shape below the foot bearing exists and the bearing part for the foot bearing is freely oscillatably connected with the stationary part of the collar bearing, the bearing parts arranged within the bell for carrying large masses and their resilient connection being according to the invention situated below the rotating mass, an upwardly projecting spindle shank being arranged for receiving the bobbins. The spring connecting the two stationary bearing parts is preferably a tension spring, so that the two parts are pulled the one against the other and which mutually support one another through the intermediary of a damping means. The two bearing parts might, however, be made in one piece which is constructed as a helical spring below the foot bearing. It is also advantageous to connect the spindle bell with the downwardly drawn neck bearing by a key and groove connection which allows the spindle to move in an axial direction so that the axial impacts are taken up by the resilient connection of the bearing parts.

This spindle construction possesses the advantage that the mass set thereon can adjust itself in the ideal axis according to the centrifugal forces which occur. The spindle, in this construction, is capable of yielding to these centrifugal forces without hindrance, that is, the rotating mass can automatically displace itself according to the theory of gyration so that the centre of gravity moves into the ideal axis. This is attained by the resilient connection between the two bearing parts being located directly below the rotating mass. Another advantage of this construction is, that such a spindle runs absolutely steadily at any speed of rotation so that on the one hand the bearings are stressed less heavily and consequently last longer and on the other hand considerably less power is required.

An embodiment of the invention is illustrated by way of example in longitudinal section in the only figure of the accompanying drawing.

The spindle shank 1, which in the example illustrated carries a large flanged bobbin 2, is mounted in a foot bearing 3 constructed as a roller bearing directly below the mass. The stationary bearing part carrying the foot bearing 3 is connected with another stationary bearing part 5 by a spring 6 with open coils, a damper 7 being arranged between the two bearing parts. This resilient connection is arranged directly below the flanged bobbin 2. The bell 8 rigidly connected with the spindle shank 1 and serving as driving wharve is supported on the lower part 10 of the spindle by a collar bearing 9. Owing to this construction the spindle can adjust itself according to the gyrating effect, in that the connection spring and the oscillatable bearing can yield to the displacement which occurs. To avoid any unsteadiness it is advisable, to arrange between the two bearing parts the damper which consists for instance of a felt disc or the like. It is further advisable to avoid the spindle point resting upon a support; in the present instance the spindle point is supported by the drawn down collar bearing.

I claim:

1. A twisting spindle for carrying large rotating masses, such as wooden bobbins, flanged bobbins and the like with artificial silk, comprising in combination a fixed lower spindle part, a downwardly directed bell-shaped part surrounding the upper end of said lower spindle part, a collar bearing oscillatably and rotatably supporting said bell-shaped part on said lower spindle part, a spindle shank rigidly fixed in and projecting from the upper end of said bell-shaped part and rotatable therewith, a bearing part on the upper end of the lower spindle part, a second bearing part in the upper end of said bell-shaped part and supported by said first mentioned bearing part, a foot roller bearing fitted in the upper end of said second bearing part and rotatably guiding the lower end of said spindle shank, and a helical tension spring embracing and thus resiliently connecting the two bearing parts.

2. A twisting spindle for carrying large rotating masses, such as wooden bobbins, flanged bobbins and the like with artificial silk, comprising in combination a fixed lower spindle part, a downwardly directed bell-shaped part surrounding the upper end of said lower spindle part, a collar bearing oscillatably and rotatably supporting said bell-shaped part on said lower spindle part, a spindle shank rigidly fixed in and projecting from the upper end of said bell-shaped part and rotatable therewith, a bearing part on the upper end of the lower spindle part, a second bearing part in the upper end of said bell-shaped part and supported by said first mentioned bearing part, a foot roller bearing fitted in the upper end of said second bearing part and rotatably guiding the lower end of said spindle shank, a helical tension spring embracing and thus resiliently connecting the two bearing parts, and a shock absorbing device interposed between the two bearing parts.

OTTO BOCHMANN.